United States Patent Office 3,623,387
Patented Nov. 30, 1971

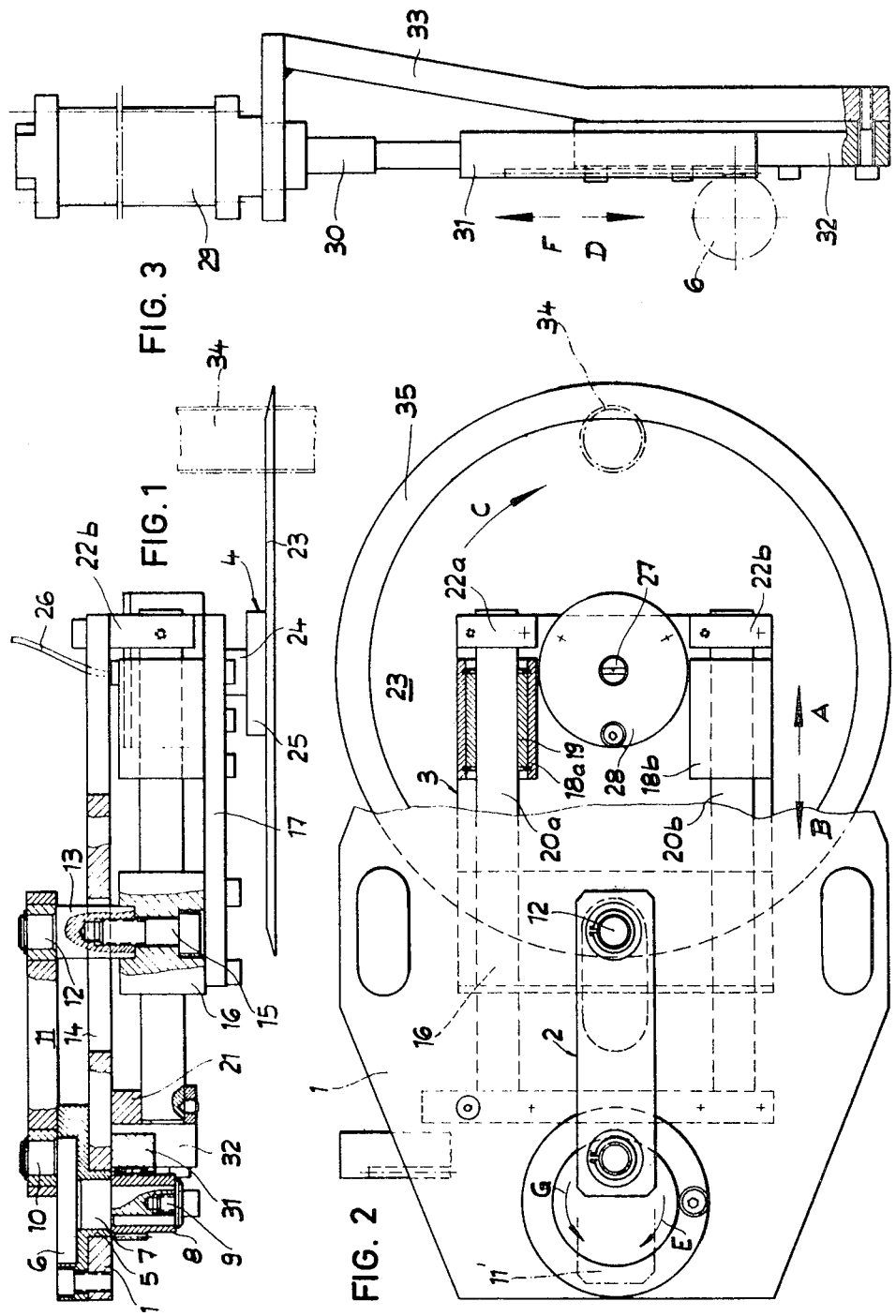

3,623,387
APPARATUS FOR SEVERING CONTINUOUSLY EXTRUDED THERMOPLASTIC MATERIAL
Gottfried Mehnert, Berlin, Germany, assignor to Conduco A.G., Zug, Switzerland
Filed Oct. 2, 1969, Ser. No. 863,772
Claims priority, application Germany, Oct. 5, 1968, G 68 01 078
Int. Cl. B26d 3/16
U.S. Cl. 83—355          13 Claims

ABSTRACT OF THE DISCLOSURE

Apparatus for severing one or more continuously extruded tubes of deformable synthetic thermoplastic material in a blow molding machine comprises a carriage supporting one or more rotary circular knives which are driven at a high speed and a crank drive which reciprocates the carriage to thereby rapidly move each knife across and away from the path of a tube. The crank drive receives motion from a double-acting pneumatic cylinder, and each knife is provided with a serrated cutting edge.

BACKGROUND OF THE INVENTION

The present invention relates to apparatus for severing deformable materials, particularly for severing continuously extruded elongated tubular bodies consisting of synthetic thermoplastic material to subdivide such bodies into parisons capable of being used in a blow molding machine for the production of bottles or other hollow articles.

Recent types of blow molding machines usually employ tubular parisons of deformable synthetic thermoplastic material which are obtained by subdivision of a continuously extruded tube through the nozzle of an extruding machine. Each parison is introduced between the sections of an open-and-shut blow mold wherein the parison is thereupon expanded so that it follows the outline of the mold cavity and assumes the shape of a bottle, fuel container, sound absorber, float, or the like. The mold may include two or more sections and it is customary to expand parisons in response to blowing of air or other suitable gas so that the wall thickness of the parisons decreases during conversion into hollow plastic articles.

Problems arise in connection with severing of a continuously extruded tubular body of thermoplastic material, especially if the extruded material is a thin-walled structure which is likely to undergo deformation in response to severing by a conventional knife. A "clean" cut at one or both ends of a parison is particularly desirable when the parison is to be converted into a bottle or a like container having a neck provided with a material-admitting and/or evacuating opening. In many instances, the neck is formed and calibrated by a blowing mandrel which admits into one end of the parison a compressed gas while the other end of the parison is closed, for example, by pinching it between projections provided on the sections of the blow mold. The mandrel calibrates the neck from within and the adjoining parts of the closed mold calibrate the neck from without. The compressed gas is admitted through an axial bore of the mandrel while the mandrel expands the open end portion of the parison radially. It is also known to provide the mandrel with a knife which separates from the neck of a finished bottle or a like container the surplus of plastic material so that the neck is provided with a circular end face which is free of undesirable protrusions. Introduction of the mandrel into the open end of the parison is facilitated if the parison is severed from a continuously extruded tube without any appreciable deformation, particularly without flattening of the open end. Such severing of parisons is difficult to achieve, especially with presently known severing apparatus, when the continuously extruded tube is a thin-walled body and is relatively soft so that it is likely to yield in response to engagement with the cutting edge immediately prior to penetration of such edge into the plastic material. If the open end of the parison is deformed, the mandrel which is normally introduced at a high speed is likely to move the parison axially and/or to otherwise displace or deform the parison so that the shape and/or quality of the ultimate product is less than satisfactory.

Proposals to use severing apparatus in the form of shears have met with little success because the blades of the shears engage the continuously extruded tube at two separate points and, therefore, the likelihood of undesirable deformation is greater than in an apparatus utilizing a single knife. The same holds true for severing apparatus utilizing a movable knife and a stationary counterknife. Certain recent types of severing apparatus employ heated wires which are moved at right angles to the direction of movement of a continuously extruded tube. However, to be effective, the wire must be heated to a temperature at which the plastic material burns and thereby undergoes undesirable chemical changes. Such changes are observable in the material which is removed as surplus and which, therefore, cannot be reused for the production of hollow plastic articles. Certain other types of severing apparatus employ rapidly orbiting knives or blades which are mounted on arms driven at a high speed to move the cutting edge of the knife along a circular path which intersects the path of the continuously extruded tube. Experiments have shown that an orbiting knife will operate satisfactorily only when the wall thickness of the tube exceeds a certain value. A thin-walled tube is invariably deformed in response to impact of the edge of the orbiting knife to thereby close the mandrel-receiving end of a freshly formed parison as well as to deflect the leading end of the remainder of the continuously extruded tube from its normal path.

SUMMARY OF THE INVENTION

An object of the invention is to provide a severing apparatus for continuously extruded bodies, particularly for severing of continuously extruded tubes of deformable synthetic thermoplastic material, which is equally suited for severing of thin-walled or thick-walled tubes and which can sever such bodies without any appreciable deformation or without undue deformation at desired intervals and in a novel and improved way.

Another object of the invention is to provide a severing apparatus which can be used for severing of a single continuously extruded tube or for simultaneous severing of two or more tubes.

A further object of the invention is to provide an apparatus which can be readily converted for the production of shorter or longer parisons, which can sever tubes of greater or smaller diameter, and which can sever tubes consisting of different types of deformable thermoplastic material.

An additional object of the invention is to provide an apparatus which does not affect the properties of severed material and which can be used in presently known blow molding or like machines.

Still another object of the invention is to provide a severing apparatus which can subdivide one or more continuously extruded deformable tubes into parisons of desired length irrespective of the speed at which the tubes are extruded and which occupies relatively little room in a blow molding or like machine.

The invention is embodied in an apparatus for severing deformable material, particularly for severing parisons from tubular bodies which are continuously extruded along a predetermined path in a blow molding machine. The apparatus comprises a cutting unit including at least one rotary circular knife, rotating means for the knife or knives, and reciprocating means operative to move the knife or knives across and away from the path of the respective tubular body so that each knife severs the respective body at desired intervals to separate therefrom parisons of appropriate length.

The reciprocating means preferably comprises a crank drive and a fluid-operated motor for the crank drive. The arm of the crank drive preferably reciprocates the cutting unit through the intermediary of a carriage which supports the cutting unit and is confined to reciprocatory movement along a preferably straight path by guide means including, for example, a set of parallel tie rods which are mounted on a plate or an analogous main supporting member forming part of or secured to the frame of a blow molding machine.

The novel features which are considered as characteristic of the invention are set forth in particular in the appended claims. The improved severing apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a side elevational view of a severing apparatus which embodies one form of the invention, with certain parts shown in vertical section;

FIG. 2 is a plan view of the severing apparatus substantially as seen in the direction of arrow II in FIG. 1 and with certain parts broken away;

FIG. 3 is a plan view of a detail substantially as seen in the direction of arrow III in FIG. 1;

DESCRIPTION OF THE PREFERRED EMBODIMENTS

Figure 4:
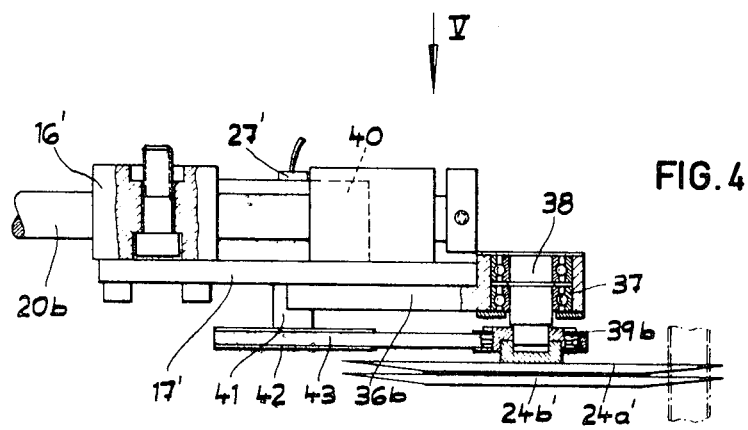
FIG. 4 is a fragmentary side elevational view of a second severing apparatus with two rotary cutters.

Referring first to FIGS. 1 and 2, there is shown a severing apparatus (also called cutoff) which comprises a platelike main support 1 mounted in or forming part of the frame of a blow molding machine (not shown), a reciprocating mechanism 2 mounted on the support 1, a carriage 3 which is reciprocated in response to operation of the mechanism 2, and a cutting unit 4 mounted on the carriage 3.

The reciprocating mechanism 2 includes a crank drive having a bearing sleeve 5 mounted in the support 1 and accommodating a rotary member here shown as a disk 6 having a shaft 7 which extends downwardly through and beyond the sleeve 5 and is fixedly secured to a gear or pinion 8 by means of a screw 9 or an analogous fastener. The disk 6 is provided with an upwardly extending eccentric pin 10 for one end of a crank arm 11 the other end of which carries a downwardly extending pin or follower 12 having an enlarged portion or boss 13 slidable in an elongated straight slot 14 of the support 1. The boss 13 is separably connected by a screw 15 to a crosshead or bridge 16 forming part of the aforementioned carriage 3. The latter further includes a base plate 17 which is rigid with the crosshead 16, and two parallel bearing sleeves or muffs 18a, 18b each of which is secured to and is located at a level above the base plate 17. The muffs 18a, 18b accommodate cylindrical bearing elements 19. The guide means for insuring that the carriage 3 (including the crosshead 16, base plate 17 and muffs 18a, 18b) is confined to reciprocatory movement along a straight path includes two tie rods 29a, 20b each of which extends through one of the bearing elements 19 and each of which has its rear or left-hand end portion secured to a traverse 21 forming part of or secured to the support 1. The front or right-hand end portions of the tie rods 20a, 20b are respectively fixed to brackets 22a, 22b which are secured to and extend downwardly from the support 1. It is clear that the brackets 22a, 22b can be replaced by a single member, such as the traverse 21, and/or vice versa. It is further clear that the carriage can be designed in a number of different ways without departing from the spirit of the present invention. For example, the aforementioned muffs 18a, 18b can be combined into or replaced with a crosshead similar to the crosshead 16, and the two crossheads can be coupled to each other by rods or the like. It is also possible to replace the crosshead 16 with one or more pairs of muffs or to mount the tie rods 20a, 20b on the carriage and the muffs 18a, 18b on the support 1.

The cutting unit 4 is mounted on the base plate 17 of the carriage 3 and comprises a rotary circular knife 23 having a hub 25 which is mounted on a vertical output shaft 24 rotatable in the base plate 17 and receiving torque from a flexible drive shaft 26. The numeral 27 denotes a coupling between the shafts 26 and 24. A casing 28 serves to accommodate an antifriction bearing and/or a friction clutch for the flexible shaft 26. The means for rotating the shaft 26 is not shown in the drawing.

The prime mover which forms part of the reciprocating mechanism 2 and serves to rotate the disk 6 to thereby effect reciprocation of the carriage 3 includes a fluid-operated (preferably pneumatic) double-acting cylinder 29 (FIG. 3) having a piston whose piston rod 30 reciprocates a toothed rack 31 mating with the pinion 8 on the shaft 7. The rack 31 is guided by ways 32 secured to a holder 33 which also supports the cylinder 29 and may be affixed to the support 1. It is clear that the pinion 8 can be omitted if the disk 6 is replaced with or includes a gear which meshes with the rack 31. The structure shown in FIGS. 1–3. is preferred when it is desired to design a compact severing apparatus wherein the piston rod 31 must perform relatively short strokes.

FIGS. 1 and 2 illustrate the cutting unit 4 in a position it assumes when the rotary knife 23 has completed a severing operation, i.e., after the knife 23 has separated from the continuously extruded tube 34 a tubular parison of desired length. The foremost position of the carriage 3 and cutting unit 4 is indicated by solid lines. The broken-line position 11' of the crank arm 11 corresponds to fully retracted position of the carriage 3 and 4; the knife 23 is then laterally spaced from the tube 34 so that the latter can be extruded without any interference on the part of the unit 4. The arrangement is preferably such that the completion of a forward or return stroke of the carriage 3 necessitates one-half of a revolution of the pin 10 about the axis of the disk 6. This is readily achieved by proper selection of the stroke of the piston rod 30, of the diameter of the pinion 8 and the length of the rack 31. The directions of movement of the rack 31 are indicated by arrows D and F (FIG. 3). When the rack 31 moves in the direction of arrow D, the pin 10 travels in a clockwise direction (arrow G) when the piston rod 30 is caused to move the rack 31 in the direction indicated by arrow F. It will be seen that the pin 10 travels between two dead-center positions in response to alternating forward and return strokes of the piston rod 30 rack 31. The knife 23 is thereby moved between the illustrated foremost position and a retracted or ineffective position in which the leading end of the tube 34 can advance across and downwardly beyond the plane of the knife. The shaft 26 continuously drives the knife 23 at a high speed in a clockwise direction (arrow C in FIG. 2). The directions of reciprocatory movement of the carriage 3 and cutting unit 4 are indicated by arrows A and B (FIG. 2).

If desired, the mechanism 2 and/or its prime mover can be designed in such a way that the disk 6 need not turn back and forth but is always rotated in a single direction in response to each second stroke of the rack 31. This can be achieved, for example, by installing a one-way coupling between the shaft 7 and pinion 8 so that the rack 31 can rotate the disk 6 only during movement in the direction indicated by the arrow D or F. Also, the rack 31 can be guided in such a way that it meshes with the pinion 8 during movement in the direction indicated by arrow D but not during movement in the opposite direction (arrow F), or vice versa.

An advantage of a fluid-operated prime mover, particularly a pneumatically operated prime mover, is that the piston rod can be moved at a very high speed so that the very thin knife 23 can penetrate into the tube 34 at an extremely high (lightning-like) speed to insure the formation of clean cuts. It was found that the knife 23 can form clean cuts even if the wall of the tube 34 is extremely thin. The circular cutting edge 35 of the knife 23 is preferably serrated or undulated not unlike the cutting edge of a steak knife; this also contributes to the formation of clean cuts. Extremely rapid reciprocation of the knife 23 in directions indicated by the arrows A, B is desirable for the additional reason that the knife should be rapidly retracted upon completion of a cut so that the tube 34 can be extruded without any appreciable interference on the part of the unit 4.

Figure 5:
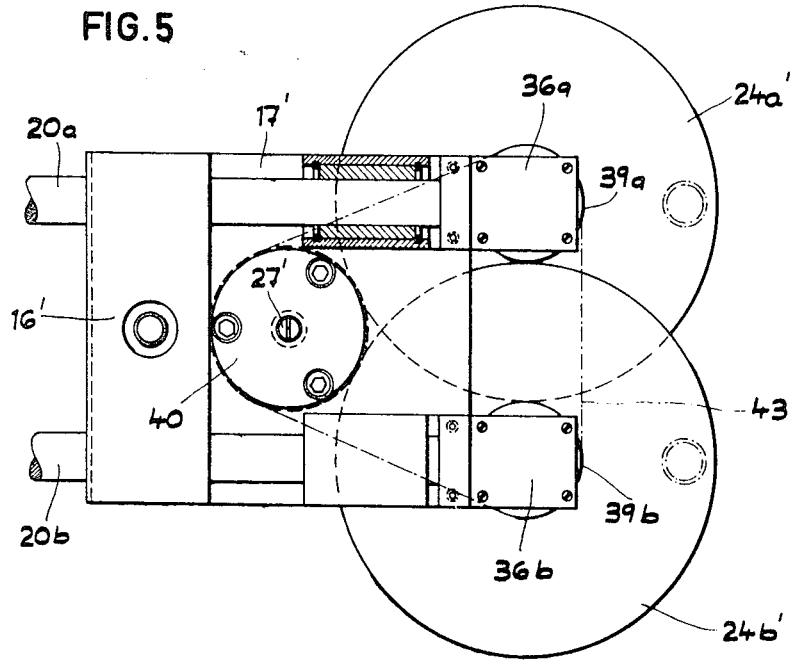
FIG. 5 is a plan view of the structure shown in FIG. 4 as seen in the direction of arrow V.

The improved apparatus can be readily designed to sever two or more continuously extruded tubes at a time or in a desired sequence. This is desirable in blow molding machines which employ several extruders each of which extrudes a discrete tube. FIGS. 4 and 5 illustrate an apparatus which can be employed for simultaneously severing two continuously extruded parallel tubes (indicated by phantom lines). The reciprocating mechanism and the main support of the apparatus shown in FIGS. 4 and 5 were omitted for the sake of clarity. The reciprocating mechanism can be identical with or similar to the mechanism 2 of FIGS. 1 and 2. The apparatus of FIGS. 4 and 5 comprises two bearing plates 36a, 36b which are bolted or otherwise secured to the underside of the base plate 17' of the carriage and extend forwardly in alignment with the tie rods 20a, 20b. The plates 36a, 36b accommodate roller bearings 37 for shafts 38 provided with pulleys or sheaves 39a, 39b. The pulleys 39a, 39b respectively drive two rotary circular knives 24a', 24b. If the diameters of the knives are such that they must overlap, the two knives must be placed into different planes (see FIG. 4). The means for rotating the pulleys 39a, 39b comprises a further pulley 42 mounted on a shaft 41 which is journalled in the base plate 17' adjacent to the crosshead 16' of the carriage, and an endless belt 43 which is trained over the pulleys. The numeral 40 denotes a gear box for a transmission whose output member is the shaft 41 and whose input member is a flexible shaft coupled to the gear case 40, as at 27'. The apparatus of FIGS. 4 and 5 occupies the same amount of space as or only little more space than the apparatus of FIGS. 1–3 but is capable of severing a plurality of extruded tubes at a time. Savings in space are very important in many types of blow molding machines.

The feature that the knife or knives of the cutting unit are rotated at a high speed about their own axes during reciprocation of the carriage for the cutting unit is believed to be one of the important factors which insure that the edges of the knives can form clean cuts not only in thick-walled but also in thin-walled tubes and that such clean cuts are obtained even if the tubes are extruded at a high speed. Another important factor is the ability of the reciprocating mechanism to move the carriage back and forth at extremely high speeds so that the revolving knives overcome the inertia of the hanging tubes and sever them before the tubes can undergo appreciable deformation or before the tubes can be moved away from their predetermined path.

A rotational speed for the knife or knives of the cutting unit of 2,000 r.p.m. has been practised with good results, yet other speeds may be suitable, while the fluid operated cylinders of the reciprocating mechanism can be of commercial type.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. Apparatus for severing deformable material, particularly for severing parisons from tubular bodies which are continuously extruded along a predetermined path in a blow molding machine, comprising a cutting unit including at least one rotary circular knife; rotating means for rotating said knife; reciprocating means operative to move said knife across and away from the path of a tubular body so that the knife severs the body at desired intervals; a carriage supporting said cutting unit; and guide means for confining said carriage to reciprocatory movement in response to operation of said reciprocating means, said recirculating means comprising a driven rotary member, a crank arm eccentrically coupled to said rotary member and articulately connected to said carriage and prime mover means for rotating said rotary member, said prime mover means including a gear secured to said rotary member, a rack meshing with said gear, and means for reciprocating said rack.

2. Apparatus as defined in claim 1, wherein said path is elongated and said knife is located in a plane which is substantially normal to said path.

3. Apparatus as defined in claim 1, wherein said guide means includes a plurality of parallel tie rods, said rotating means comprising shaft means and said carriage comprising bearing means for said shaft means.

4. Apparatus as defined in claim 3, wherein said carriage further comprises a base member supporting said cutting unit, a crosshead mounted on said base member and slidable along said tie rods, and a plurality of bearing elements each mounted on said base member and each slidable along one of said tie rods.

5. Apparatus as defined in claim 4, wherein said knife is located at one side and said crosshead and said bearing elements are located at the other side of said base member.

6. Apparatus as defined in claim 1, wherein said rotary member comprises a shaft and said gear is a pinion coaxially secured to said shaft.

7. Apparatus as defined in claim 1, wherein the means for reciprocating said rack comprises a fluid-operated motor.

8. Apparatus as defined in claim 7, wherein said motor is a double-acting cylinder having a piston rod connected to said rack and further comprising ways for said rack.

9. Apparatus as defined in claim 1, wherein said knife is provided with a circumferentially extending serrated cutting edge.

10. Apparatus for severing deformable material, particularly for severing parisons from tubular bodies which are continuously extruded along a predetermined path in a blow molding machine, comprising a cutting unit including a plurality of rotary circular knives each arranged to sever a discrete tubular body; rotating means for rotating said knives; and reciprocating means operative to move said knives across and away from the paths of the respective discrete tubular bodies so that the knives sever the respective bodies at desired intervals in response to operation of said reciprocating means.

11. Apparatus as defined in claim 10, wherein said knives are located in substantially parallel planes.

12. Apparatus as defined in claim 10, wherein said rotating means is arranged to simultaneously rotate all of said knives at a high speed.

13. Apparatus as defined in claim 12, wherein said rotating means comprises a pulley secured to each of said knives, belt means trained over said pulleys, and drive means for said belt means.

References Cited
UNITED STATES PATENTS

| | | | |
|---|---|---|---|
| 1,200,019 | 10/1916 | Pletz | 83—487 X |
| 1,505,764 | 8/1924 | Biggert, Jr. | 83—487 X |
| 2,551,811 | 5/1951 | Mueller | 83—487 X |
| 2,692,645 | 10/1954 | Driesch | 83—355 |
| 3,044,336 | 7/1962 | Block | 83—488 X |
| 3,296,914 | 1/1967 | Shallenberg | 83—488 |
| 3,491,637 | 1/1970 | Hasten et al. | 83—355 X |

FRANK T. YOST, Primary Examiner

U.S. Cl. X.R.

83—488, 646